United States Patent [19]
Frazier

[11] 4,089,009
[45] May 9, 1978

[54] FONT FASTENING MEANS

[75] Inventor: Clifford John Frazier, Wilmette, Ill.

[73] Assignee: Castcraft Industries, Inc., Chicago, Ill.

[21] Appl. No.: 760,562

[22] Filed: Jan. 19, 1977

[51] Int. Cl.² .............................................. G03B 15/00
[52] U.S. Cl. ........................................ 354/15; 354/18; 354/19; 402/60
[58] Field of Search ............... 354/15, 18, 19; 402/60, 402/61, 64

[56] References Cited

U.S. PATENT DOCUMENTS

Re. 28,785 4/1976 Hanson et al. ........................ 354/15

*Primary Examiner*—Russell E. Adams
*Attorney, Agent, or Firm*—Laff, Whitesel & Rockman

[57] ABSTRACT

A perforated film matrix is attached to a cylindrical drum by means of clips having an upwardly raised flange along one edge. The film matrix is initially held on the drum by two pairs of protruding members extending through said perforations. The clips are then vertically inserted along opposite borders of the film matrix between each pair of protruding members.

10 Claims, 8 Drawing Figures

FONT FASTENING MEANS

This invention relates to film fonts or matrices and, more particularly, to means for fastening these matrices to rotatable drums used in phototypesetting devices.

A film font or matrix, as the term is used herein, is a piece of film which includes an assortment or font of type, all of one size and style. The type on any one font may consist of letters, numerals or other characters, but they generally share some common traits in terms of physical appearance. In recent years, an entire industry called phototypesetting has developed from the use of film fonts. Phototypesetting devices have been developed which shine a narrow beam of light at a particular character on the film matrix and, since the matrix used is a negative, an image of the desired character is projected onto a piece of light sensitive paper behind the matrix. By adjusting the position of a drum to which the film font is attached, the light focuses on a desired sequence of characters and entire words and sentences can be printed.

Commonly, a phototypesetting job, or series of jobs, utilizes more than one particular style of type, such as bold, italic, etc. In order to provide quick and easy access to multiple fonts, phototypesetting devices may include means to mount several different fonts at the periphery of a cylindrical drum, with the focusing light positioned in the middle of the drum. In this manner, the drum can be rotated by a computer to position the desired character on the desired font in line with the light beam.

Great care must be exercised to protect the film fonts from dirt or scratches which would show up on the projected images of the characters. Nevertheless, during the process of mounting and dismounting the fonts from the cylindrical drum the fonts are often and easily scratched by the drum or by fingernails. To a large part, this problem is caused by the clumsy means presently available for securing these fonts to the drum, which require excessive manipulation of the font and hand contact with the surface of the font.

Another problem encountered in the prior art is that of maintaining the film matrix flush against the surface of the drum. In order to avoid a blurred image, the film matrix must be maintained perpendicular to the light beam which is directed axially from the middle of the drum. If the matrix is not firmly and evenly fastened to the drum, the matrix will bulge or curl, causing blurred and poorly formed images during the phototypesetting process.

One of the prior art means for securing a film matrix to a rotating drum is disclosed in U.S. Pat. No. 3,738,236. The patent discloses a film negative with two reenforcing members permanently secured directly to the negative, one on each side. One reenforcing member comprises a bar, extending about three quarters of the height of the negative, which is inserted under two hook elements located on and protruding from the drum. The other reenforcing member comprises a shorter bar centrally positioned along the side of the negative with a wire spring element extending out from each end of the bar. These spring elements bear against two spherical elements, also located on and protruding from the drum. Two pins protruding from the drum and through the negative are also intended to secure the negative to the drum in the aforementioned patented structure.

This fastening means, like others in the art, still encounters the problems of buckling and insecure film fonts. The springs means, after prolonged use, lose their elasticity, become permanently misshapen, or break off. When this happens, the film matrices can no longer be employed on a drum since the permanently affixed reenforcing members are useless without the springs. Also, because of the tensioned fit of the other reenforcing bar, more manipulation is required, and, hence, more chance of scratching or smudging the negative is created in mounting the negative.

Accordingly, an object of the present invention is to provide a new and improved means for fastening film matrices to drums in phototypesetting devices. A more particular object is to provide a simple and inexpensive fastening means which can be employed more easily and with less chance of damaging the film matrix than conventional fastening means.

Another object is to provide a fastening means which more firmly secures the film matrix to the surface of a rotatable drum. Yet another object is to provide a fastening means which is not permanently affixed to the film matrix and can be used with a variety of commercially available film matrices and drums.

In keeping with one aspect of this invention, a fastener or clip is used to firmly attach a film matrix to a rotatable drum. The film matrix, perforated near each of its vertical borders, is initially held on the drum by two pairs of protruding members fixed along the periphery of the drum. One member of each pair extends through the perforations. The clips are then inserted between each pair of protruding members and along the vertical borders of the film matrix. One edge of each clip has an upwardly raised flange which bears against a protruding member. The other edge of each clip snugly fits between the other protruding member and the drum. Desirably, the clip also has a neck portion which grips and overhangs the rim of the drum.

The above mentioned and other features of this invention and the manner of obtaining them will become more apparent, and the invention itself will be best understood by reference to the following description of an embodiment of the invention taken in conjunction with the accompanying drawings, in which.

Figure 1:
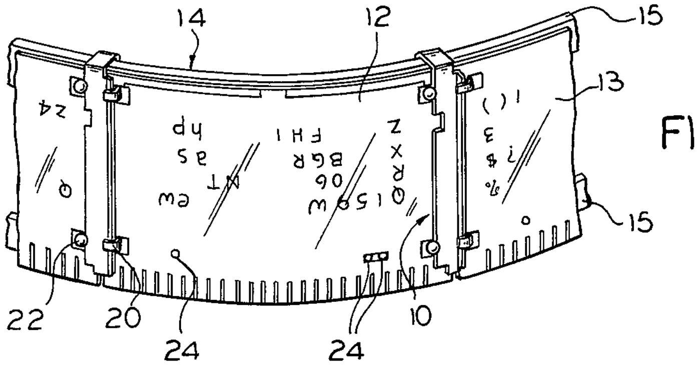
FIG. 1 is a perspective view of the invention in position on a drum.

As shown in FIG. 1, a fastener or clip 10 for attaching a film matrix 12 on a drum 14 is positioned along both vertical borders of matrix 12. The drum 14 is basically composed of a pair of circular rims 15 spaced apart by a distance approximately the height of a film matrix and connected at several points along the circumference by vertically connecting bars 16 (not shown).

Figure 2:
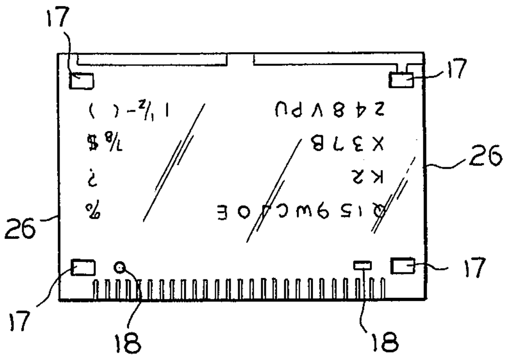
FIG. 2 is a plan view of one type of film matrix.

One type of film matrix 12 which can be used in connection with this invention is illustrated in FIG. 2. The matrix 12 is simply a piece of film containing various characters and perforated with appropriately placed mounting holes 17 and guide holes 18. Matrix 12 is initially positioned on drum 14 by inserting hooks 20, spherical members 22 and, where desired for added protection against skewing, pins 24 protruding from the drum 14 through the corresponding mounting holes 17 and guide holes 18 in the film matrix 12 (FIG. 1). To securely affix the matrix 12 to drum 14, a clip 10 is slip between the pairs of protruding members, each pair including one hook 20 and one spherical member 22, along and on top of borders 26 and 27 of adjacent matrices 12 and 13. See FIG. 6.

Figure 3:
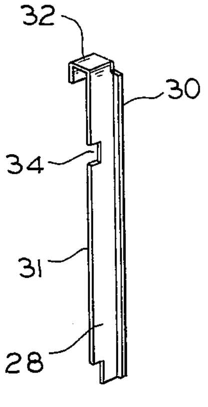
FIG. 3 is a perspective view of the invention.
Figure 4:
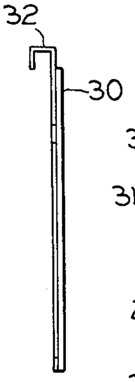
FIG. 4 is a side view of the invention.
Figure 5:
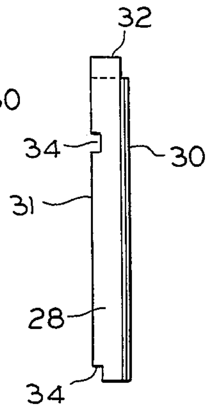
FIG. 5 is a plan view of the invention.

Clip 10 is shown in more detail in FIGS. 3–5. Clip 10 comprises a strip or band 28 forming the major portion of its body. The band is approximately the same length as border 26 of film matrix 12. The clip 10 also comprises an upwardly raised flange 30 extending along one edge of band portion 28. The flange 30 forms an angle with band 28 approximating ninety degrees. The height of flange 30 is approximately the same as the distance between the underside of hook 20 and drum 14 (FIG. 7), less the thickness of film 13.

Desirably, the clip 10 also comprises a neck portion 32 extending from one end of the clip which is contoured to grip and overhang a rim 15 of drum 14. For the particular rim 15 illustrated herein having a rectangular cross section, the neck 32 is formed in a generally inverted U-shape. This shape permits the neck to lie over the top and extend down the back portion of the rim. Another preferable feature of this invention is one or more notches 34 included along the edge 31 of band 28 opposite flange 30. These notches are wide and long enough to exceed the diameter of spherical members 22 affixed to drum 14, and they facilitate insertion of the clip onto the drum.

Figure 6:
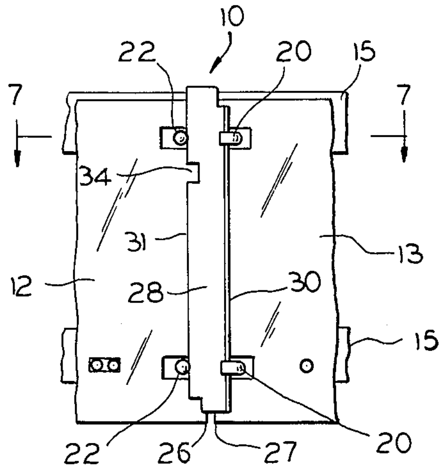
FIG. 6 is a plan view of the invention in position on a drum.
Figure 7:
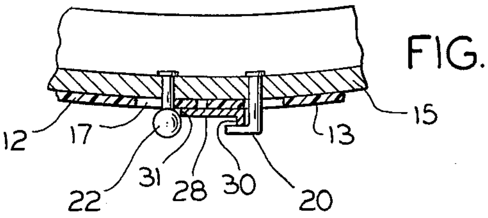
FIG. 7 is a cross sectional view of the invention in position on a drum.

The manner in which clips 10 are inserted and used to securely retain a film matrix 12 against drum 14 is shown in FIGS. 6 and 7. After film matrices 12 and 13 are initially positioned on drum 14 with the protruding members 20, 22 and 24 extending through the mounting holes 17 and guide holes 18 as described above, the clip 10 is inserted between the protruding members of the drum by positioning the flange 30 directly under hooks 20.

The opposite edge 31 of band 28 is snugly inserted under the spherical member 22. In this manner, the clip 10 can be slid along the borders 26 and 27 of two adjacent film matrices 12 and 13 until the entire length of the borders of both matrices are covered by the clip. The tension created between the flange 30 and hook 20 and between edge 31 and spherical member 22 forces the matrices 12 and 13 against drum 14, thereby securing them to the drum. By inserting clips 10 at the junction of each matrix with the adjacent matrix, a plurality of matrices can be attached to the drum in preparation for phototypesetting.

Depending on the precise separation between the hook 20 and spherical member 22, it may be necessary to slightly tilt the clip 10 in order to initially insert it under hook 20. Also for this reason, notches 34 are provided along the edge 31 of the band 28 opposite flange 30. If the notches are aligned with the spherical members 22 so as to partially surround the member when the clip is initially inserted in position, the clip can be more easily slid along the border 26 of matrix 12.

Figure 8:
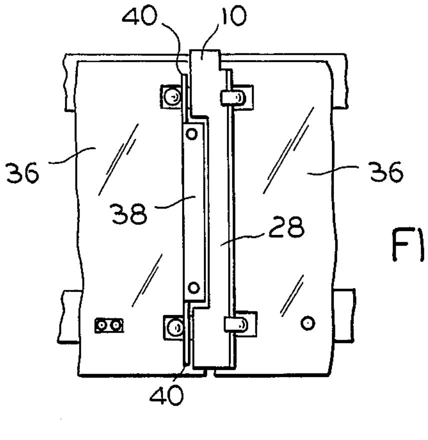
FIG. 8 is a plan view of the invention used with another type of film matrix.

Another type of film matrix 36 currently in popular use is partially shown in FIG. 8. This matrix 36 employs a bar 38 permanently affixed along a border of the matrix with a wire element 40 extending out from each end of bar 38. Along the opposite border of matrix 36 is another bar (not shown) without the wire elements 40 extending along the entire length of the border of the matrix. The present invention is adapted for use with these or similarly constructed matrices. The only modification necessary to the clip 10 as previously described is to narrow the width of the band portion 28 so that it frictionally abuts against the edge of bar 38, thereby holding matrix 36 securely against the drum 14.

A clip according to this invention can be constructed in a variety of widths and lengths to accommodate the various film matrices and drums available on the market. The clips 10 are composed of a relatively rigid material, such as plastic or metal. Preferably, the clips are also flexible enough so that the same clips can be used on drums having rims of somewhat different widths. The neck portions 32 of the clip 10 can then be expanded or contracted according to the particular rim used.

The many advantages of this clip are self-apparent. First, a clip according to this invention is simple and inexpensive to construct. Second, the clip can be inserted easily and with a minimum of contact to the film matrix, thereby reducing the chance of damage to the matrix. Third, the clip more firmly secures the matrix to the drum because a portion of the clip fastens directly to the drum. Fourth, the clip is not permanently affixed to the film matrix and can be easily replaced if it becomes defective, without replacing the entire matrix. Fifth, the same clip can be used with a variety of film matrices and drums currently in use.

While the principles of the invention have been described above in connection with specific apparatus and applications, it is to be understood that this description is made only by way of example and not as a limitation on the scope of the invention.

I claim:

1. A fastener for attaching a film matrix to a rotatable drum having at least two protruding members along its periphery, comprising:

a strip of rigid material, said strip having an upwardly raised flange along one edge, whereby said strip, when inserted between said protruding members and along said film matrix, exerts sufficient pressure against said protruding members to attach said film matrix to said drum.

2. A clip for attaching a film matrix to a rotatable drum having at least two protruding members along its periphery, comprising:

a band of rigid material, said band having an upwardly raised flange along one edge of the band, said band also having a neck portion contoured to grip the rim of said drum, whereby said band, when inserted between said protruding members and along said film matrix, exerts sufficient pressure against said protruding members to attach said film matrix to said drum.

3. The clip as recited in claim 2 wherein the neck portion is an inverted U-shape.

4. The clip as recited in claim 2 wherein the neck portion overhangs the rim of said drum.

5. The clip as recited in claim 2 wherein said band has at least one notch along the edge opposite said flange.

6. The clip of claim 2 wherein said band overlies the edges of two adjacent film matrices.

7. The clip of claim 2 wherein said band is composed of metal.

8. The clip as recited in claim 2 wherein said band extends the height of the film matrix.

9. A clip for securing two adjacent film matrices to a rotatable drum having at least two protruding members along its periphery, comprising:

a strip of rigid material, said strip having an upwardly raised flange along one edge, whereby said strip, when inserted between said protruding members at the junction of the two adjacent film matrices, overlaps the borders of the film matrices and exerts sufficient pressure against said protruding members to secure said film matrices to said drum.

10. In combination with a phototypesetting apparatus of the type wherein a film matrix is mounted on a rotatable cylindrical drum having at least two pairs of members protruding from the periphery of said drum, and wherein said film matrix is initially impaled on one member of each pair protruding from said drum, the improvement comprising:

a clip for securely mounting said film matrix on said drum, said clip adapted to grip said drum and to bear against said film matrix when inserted between a pair of said protruding members.

* * * * *